United States Patent
Czihal et al.

(10) Patent No.: US 11,261,126 B2
(45) Date of Patent: Mar. 1, 2022

(54) FUNCTIONALISED BIMODAL PERIODIC MESOPOROUS ORGANOSILICATES (PMOS) AND METHOD FOR PRODUCING SAME USING PSEUDOMORPHIC TRANSFORMATION

(71) Applicant: SENTRONIC GMBH GESELLSCHAFT FÜR OPTISCHE MESSSYSTEME, Dresden (DE)

(72) Inventors: Saskia Czihal, Freital (DE); Matthias Lau, Dresden (DE); Martin Morjan, Dresden (DE)

(73) Assignee: SENTRONIC GMBH GESELLSCHAFT FÜR OPTISCHE MESSSYSTEME, Dresden (DE)

( * ) Notice: Subject to any disclaimer, the term of this patent is extended or adjusted under 35 U.S.C. 154(b) by 0 days.

(21) Appl. No.: 16/766,948

(22) PCT Filed: Nov. 26, 2018

(86) PCT No.: PCT/EP2018/082480
§ 371 (c)(1),
(2) Date: May 26, 2020

(87) PCT Pub. No.: WO2019/101980
PCT Pub. Date: May 31, 2019

(65) Prior Publication Data
US 2021/0032157 A1 Feb. 4, 2021

(30) Foreign Application Priority Data
Nov. 27, 2017 (DE) .................... 10 2017 221 195.4

(51) Int. Cl.
| | |
|---|---|
| *C03C 11/00* | (2006.01) |
| *C01B 37/02* | (2006.01) |
| *C03C 17/30* | (2006.01) |

(52) U.S. Cl.
CPC .............. *C03C 11/00* (2013.01); *C01B 37/02* (2013.01); *C03C 17/30* (2013.01);
(Continued)

(58) Field of Classification Search
None
See application file for complete search history.

(56) References Cited

U.S. PATENT DOCUMENTS

2012/0225003 A1* 9/2012 Joung .................. C01B 33/166
423/338
2016/0008737 A1 1/2016 Wyndham et al.

FOREIGN PATENT DOCUMENTS

| CN | 105102116 A | 11/2015 |
|---|---|---|
| DE | 102005030004 A1 | 12/2006 |

(Continued)

OTHER PUBLICATIONS

Asefa et al., "Periodic Mesoporous Organosilicas with Organic Groups Inside the Channel Walls," Mamillan Magazines Ltd, Nature, vol. 402, Dec. 1999, pp. 867-871.
(Continued)

*Primary Examiner* — Jeffrey D Washville
(74) *Attorney, Agent, or Firm* — Heslin Rothenberg Farley & Mesiti P.C.

(57) ABSTRACT

The invention relates to a method for producing functionalised bimodal periodic mesoporous organosilicates (PMOs) by means of pseudomorphic transformation, to functionalised bimodal periodic mesoporous organosilicates (PMOs) that comprise at least one organosilicate and at least one functional component, and to the use of the PMO as a filter material, adsorption means, sensor material or carrier material for pharmaceutical products, insecticides or pesticides.

20 Claims, 5 Drawing Sheets

(52) U.S. Cl.
CPC ...... *C01P 2002/88* (2013.01); *C01P 2006/12* (2013.01); *C01P 2006/17* (2013.01); *C03C 2217/48* (2013.01)

(56) References Cited

FOREIGN PATENT DOCUMENTS

| DE | 102005030004 A1 | 12/2006 |
|---|---|---|
| DE | 102008015756 A1 | 10/2009 |
| DE | 102008015756 A1 | 10/2009 |

OTHER PUBLICATIONS

Attard et al., "Liquid-Crystalline Phases as Templates for the Synthesis of Mesoporous Silica," Nature Publishing Group, Nature, vol. 378, Nov. 23, 1995, pp. 366-368.
Beck et al., "A New Family Mesoporous Molecular Sieves Prepared with Liquid Crystal Templates," Journal American Chemical Society, vol. 114, No. 27, Jun. 30, 1992, pp. 10834-10843.
Hoffmann et al., "Silica-Based Mesoporous Organic-Inorganic Hybrid Materials," Angewandte Chemie, Int. Ed. 2006, vol. 45, pp. 3216-3251.
Inagaki et al., "Novel Mesoporous Materials with a Uniform Distribution of Organic Groups and Inorganic Oxide in Their Frameworks," Journal American Chemical Society, vol. 121, Oct. 4, 1999, pp. 9611-9614.
F. Janowski et al., Poröse Gläser—Herstellung, Eigenschaften und Anwendungen. (Porous Glasses—Manufacturing, Properties and Applications.) Editor, VEB Deutscher Verlag für Grundstoffindustrie, Leipzig, 1982.
C. T. Kresge et al., "Ordered Mesoporous Molecular Sieves Synthesized by a Liquid-Crystal Template Mechanism," Nature Publishing Group, Nature, vol. 359, Oct. 22, 1992, pp. 710-712.
Loy et al., "Bridged Polysilsesquioxanes. Highly Porous Hybrid Organic-Inorganic Materials," American Chemical Society, Chemical Reviews, vol. 95, No. 5, May 4, 1995, pp. 1431-1442.
Melde et al., "Mesoporous Sieves with Unified Hybrid Inorganic/Organic Frameworks," Chemical Materials, vol. 11, No. 11, Aug. 30, 1999, pp. 3303-3308.
Monnier et al., "Cooperative Formation of Inorganic-Organic Interfaces in the Synthesis of Silicate Mesostructures," Science, vol. 261, Sep. 3, 1993, pp. 1299-1303.
Shea et al., "Bridged Polysilsesquioxanes. Molecular-Engineered Hybrid Organic-Inorganic Materials," American Chemical Society, Chemical Materials, vol. 13, No. 10, Jul. 6, 2001, pp. 3306-3319.
Shea et al.,"Arylsilsesquioxane Gels and Related Materials. New Hybridges of Organic and Inorganic Networks," Jouranl American Chemical Society, vol. 114, No. 17, Jan. 15, 1992, pp. 6700-6710.
Uhlig, M.Sc. Hans, H. Uhlig, University of Leipzig, Faculty of Chemistry and Mineralogy, dissertation Mar. 19, 2015, pp. 1-167.
Washburn, Edward W.,"The Dynamics of Capillary Flow," The Physical Review, Second Series, vol. XVII, No. 3, Mar. 1921, pp. 273-283.
Yanagisawa et al., "The Preparation of Alkyltrimethylammonium-Kanemite Complexes and Their Conversion to Microporous Materials," The Chemical Society of Japan, Bull. Chem. Soc. Jpn., vol. 63, No. 4, Apr. 1990, pp. 988-992.
International Search Report (and English translation) and Written Opinion of the International Searching Authority for International Application No. PCT/EP2018/082480 dated Mar. 8, 2019.
Dag, O., et al., "Oriented Periodic Mesoporous Organosilica (PMO) Film with Organic Functionality Inside the Channel Walls", Adv. Funct. Mater., vol. 11, No. 3, pp. 213-217 (2001).
Guillot, M., et al., "Pseudomorphical synthesis of glasses with hierarchical macro- and mesoporosity", Microporous and Mesoporous Materials, vol. 197, pp. 83-91 (2014).
Kadib, A.E., et al., "Hybrid Materials and Periodic Mesoporous Organosilicas Containing Covalently Bonded Organic Anion and Cation Featuring MCM-41 and SBA-15 Structure", J. Am. Chem. Soc., vol. 131, No. 8, pp. 2882-2892 (2009).
Melde, B.J., et al., "Macroporous periodic mesoporous organosilicas with diethylbenzene bridging groups", Microporous and Mesoporous Materials, vol. 130, pp. 180-188 (2009).
Simon, T., et al., "Hierarchical 3D-ordered macro-/mesoporous organosilicas with inverse opal morphology synthesized by a combination of nanocasting and pseudomorphic transformation", J. Mater. Chem. C., vol. 5, pp. 5263-5268 (2017).
Turgis, R., et al., "An Original "Click and Bind" Approach for Immobilizing Copper Hexacyanoferrate Nanoparticles on Mesoporous Silica", Chem. Mater., vol. 25, pp. 4447-4453 (2013).
Wahab, M.A., et al., "Framework Functionalization of Periodic Mesoporous Organosilica with 1,2-bis[3-triethoxysilylpropyl)ureido] cyclohexane Function via Basic Co-condensation Self-Assembly", J. Nanosci. Nanotechnol., vol. 8, No. 7, pp. 3532-3538 (2008).
Wang Hui, "Research on Preparation and Performance of Diacetylene and Polymer Functionalization Hybrid Materials", China Doctoral Dissertations Full-text Database Engineering Science and Technology vol. 1, No. 08, 2017, Aug. 15, 2017.
Simon, et al., "Hierarchical 3D-ordered macro-/mesoporous organosilicas with inverse opal morphology synthesized by a combination of nanocasting and pseudomorphic transformation", The Royal Society of Chemistry 2017, J. Mater. Chem. C, 2017, 5, 5263-5268, DOI: 10.1039/c7tc01394a, May 8, 2017.

\* cited by examiner

A

B

A

B

FUNCTIONALISED BIMODAL PERIODIC MESOPOROUS ORGANOSILICATES (PMOS) AND METHOD FOR PRODUCING SAME USING PSEUDOMORPHIC TRANSFORMATION

CROSS REFERENCE TO RELATED APPLICATIONS

This application is a national stage filing under section 371 of International Application No. PCT/EP2018/082480 filed on Nov. 26, 2018, and published on May 31, 2019 as WO 2019/101980, which claims priority to German Application No. 10 2017 221 195.4, filed on Nov. 27, 2017. The entire contents of WO 2019/101980 are hereby incorporated herein by reference.

The invention relates to a method for producing functionalised bimodal periodic mesoporous organosilicates (PMOs) by means of pseudomorphic transformation, to functionalised bimodal periodic mesoporous organosilicates (PMOs) that comprise at least one organosilicate and at least one functional component, selected from a functional group, a dye, an enzyme and antibodies, and to the use of the PMO as a filter material, adsorption means, sensor material or carrier material for pharmaceutical products, insecticides or pesticides.

Porous materials, especially porous glasses with their properties such as chemical, thermal and mechanical resistance and the diversity of their geometric shape have a wide application potential. They consist of 96-98% $SiO_2$ and have a monomodal pore structure, which is structured as a sponge-like, three-dimensional network [F. Janowski, W. Heyer, Poröse Gläser—Herstellung, Eigenschaften and Anwendungen. (Porous Glasses—Manufacturing, Properties and Applications.) Editor, VEB Deutscher Verlag für Grundstoffindustrie, Leipzig, 1982.]. Porous glasses are available as spheres, granules or in monolithic form as capillaries, membranes, tubes or rods.

They are divided into microporous (<2 nm), mesoporous (2-50 nm) and macroporous substances (>50 nm) according to the pore size.

Using the sol-gel process and pseudomorphic transformation, mesoporous glasses can be produced having a specific surface area of over 1000 $m^2/g$, a narrow pore distribution and a high long-range order.

Yanagisawa et al. describe the production of mesoporous silicon dioxide materials having a uniform pore diameter from layered silicate kanemite using alkyltrimethylammonium surfactants, wherein specific surfaces of approximately 900 $m^2/g$ and pore radius distributions between 2 and 5 nm are obtained (Yanagisawa et al. 1990).

In 1992, the Mobil Oil Company developed the so-called M41S silicate phases, a class of periodically mesoporous silicon dioxide materials (Kresge et al. 1992, Beck et al. 1992). Typical representatives are Mobil Composition of Matter No. 41 (MCM-41) and Mobil Composition of Matter No. 48 (MCM-48). Disadvantageously, these inorganic compounds have hydrophilic surfaces, as a result of which hydrophobing can only be ensured by means of organofunctional inorganic anchor groups.

Silicate precursors such as tetramethyl orthosilicate (TMOS), tetraethyl orthosilicate (TEOS) or tetraisopropyl orthosilicate (TPOS) are used for the sol-gel process.

Organosilicates can be produced from silicate precursors using the sol-gel process. Shea et al. and Loyt et al. describe the production of organosilicate xerogels and aerogels using the sol-gel process from bissilylated and multisilylated organosilanes (Shea et al. 1992, Loyt et al. 1995, Shea et al. 2001). The condensation of bissilylated organosilanes with the addition of structure-directing agents (e.g. surfactants) to periodic mesoporous organosilicates (PMOs) was first described by Inagaki et al. and Melde et al. (Inagaki et al. 1999, Melde et al. 1999, Asefa et al. 1999), wherein bridged polysilsesquioxanes with organic residues are arranged in a framework with periodic, hexagonally arranged pores.

Further possibilities for producing mesoporous organosilicates are the post-preparative application of organic groups to purely inorganic, mesoporous silicate materials (grafting), wherein the surface silanol groups are reacted with organofunctional alkoxysilanes, chlorosilanes, silazanes, and co-condensation in which silicate precursors, such as TEOS, are reacted with alkoxysilanes, chlorosilanes and a structure-directing agent (Hoffmann et al. 2006). The reaction with organic molecules can lead to a decrease in porosity due to possible pore closure.

The periodic mesoporous organosilicates are formed using the endotemplate method.

In the known methods for producing mesoporous organosilicates, the blockage or bottleneck-like reduction of the pores and the inhomogeneous distribution on the surface can be disadvantageous. The macroscopic shape is not freely selectable.

In general, sol-gel chemistry leads to crack formation and shrinking processes during production, since it is a liquid-phase chemistry, and thus the macroscopic shape is difficult to adjust beforehand.

Therefore, the object of the present invention is to provide a method for producing bimodal porous materials in which the pore size, the geometry and the functionalisation can be varied.

It is also an object of the invention to provide functionalised porous materials, which are dimensionally stable.

According to the invention, the object is solved by the method according to the invention for producing functionalised bimodal periodic mesoporous organosilicates (PMOs), preferably having hexagonally or cubically arranged pores, by means of pseudomorphic transformation comprising the steps:

a) providing a monomodal mesoporous or macroporous glass,
    b) adding at least one multiply silylated organosilane and a solvent,
    c) drying and cross-linking the at least one multiply silylated organosilane on the surface of the monomodal mesoporous or macroporous glass,
    d) adding at least one structure-directing agent and pseudomorphic transformation,
    e) extracting the structure-directing agent,
    wherein at least one functional component is added after step a) and/or after step e), wherein the macroscopic shape of the mesoporous or macroporous glass remains unchanged during steps b) to e).

According to the invention, "functionalised" is understood to mean the modification with at least one functional component.

According to the invention, "monomodal" is understood to mean the presence of a pore system. According to the invention, "bimodal" is understood to mean the presence of two pore systems. A pore system is understood to be a system of cavities in materials or coatings, which are differentiated according to their pore diameter. Bimodal pore systems preferably have a hierarchical structure, i.e. the secondary pores branch off from the primary pores. According to the invention, the primary pores are understood to be pores with a larger pore diameter, also called transport pores, and the secondary pores are understood to be pores with a smaller pore diameter, also called reaction pores.

According to the invention, the pore systems comprise pores selected from mesopores and macropores. Mesopores are understood to be pores with a pore diameter of 2 nm to 50 nm. Macropores are understood to be pores with a pore diameter of at least 50 nm, preferably greater than 50 nm.

According to the invention, periodic mesoporous organosilicates (PMOs) are understood to be organosilicates having at least one system of at least partially ordered mesopores and a narrow pore radius distribution.

According to the invention, a pseudomorphic transformation is understood to be a conversion of porous silicates to ordered mesoporous silicates, so-called micellar templated silicas, using endotemplate synthesis, wherein the starting pore system, i.e. the pore system of the porous silicates, is converted to an ordered mesoporous pore system prior to pseudomorphic transformation, the macroscopic shape of the porous silicates being retained. The self-organisation of a structure-directing agent during pseudomorphic transformation creates an ordered pore system. The partial pseudomorphic transformation after step d) results in the formation of a bimodal pore system, comprising primary and secondary pores.

According to the invention, glass is understood to be an amorphous, porous solid containing silicon dioxide.

In one embodiment, the mesoporous or macroporous glass is selected from quartz glass, alkali borosilicate glass, porous silicates, e.g. VYCOR glasses, controlled porous glasses (CPGs), silica gel, MTS materials (MTS=micelle-templated silica), TRISOPOR, silicon sol-gel materials and biogenic silica, e.g. rice husk ash.

Controlled porous glasses (CPGs) are understood to be porous silicates, which are produced from alkali borosilicate glass by heat treatment, phase separation into a silicate phase and a borate phase and extraction of the borate phase.

VYCOR glass is understood to be a porous glass or quartz glass produced using the VYCOR process.

According to the invention, at least one multiply silylated organosilane is added in step b).

According to the invention, at least one functional component is added after step a) or after step e) or after step a) and after step e). The functional component is bound by adsorption or covalent bonding. A functional component is understood to be a group or a molecular residue, which has a reactivity, colour intensity, luminescence intensity, enzymatic activity or antigen-binding properties.

In another embodiment, the at least one functional component is selected from a functional group, a dye, an enzyme, a protein, an antibody, a nucleic acid, a virus or a noble metal cluster.

A functional group is understood to be a molecule, which decisively determines the material properties, in particular the hydrophobicity, and/or the reaction behaviour of the PMOs. In one embodiment, the functional group is selected from substituted alkoxysilanes, preferably 3'-glycidyloxy-propyltrimethoxysilane, 3-mercaptopropyltrimethoxysilane, 3-aminopropyltriethoxysilane, N-(6-aminohexyl)aminopropyltrimethoxysilane, trimethoxy(2-phenylethyl)silane; substituted chlorosilanes, substituted silanes, bisepoxides, substituted polydimethylsiloxanes (PDMS), preferably hydroxypolydimethylsiloxanes (OH-PDMS); substituted silazanes, preferably hexamethyldisilazane (HDMS); boranes, substituted alkoxytitanium compounds, bisilanes, alkoxides, alcohols, acids, bases, ionic liquids, isocyanates or quaternary ammonium compounds.

In one embodiment, the functional group comprises anchor molecules. Anchor molecules are understood to be a linker molecule and spacer. The anchor molecules advantageously serve as spacers.

In one embodiment, the functional components are covalently bonded to the anchor molecules.

In another embodiment, the dye is selected from oxygen-sensitive dyes, carbon dioxide-sensitive dyes, pH-sensitive dyes, temperature-sensitive dyes, pressure-sensitive dyes, nitrogen oxide-sensitive dyes, amino-sensitive dyes and/or peroxylate-sensitive dyes.

In one embodiment, the oxygen-sensitive dye is selected from luminescent dyes, preferably from metalloporphyrins, metallophenanthrolines or metallobipyridines, particularly preferablypalladium porphyrins, palladium phenanthrolines or palladium bipyridines, platinum porphyrins, platinum phenanthrolines or platinum bipyridines, or ruthenium porphyrins, ruthenium phenanthrolines or ruthenium bipyridines.

Luminescent dye is understood to be a substance, which emits light in the visible, UV or IR spectral range after energy is supplied.

In one embodiment, the carbon dioxide-sensitive dye is selected from luminescent dyes, preferably from ruthenium porphyrins, ruthenium phenanthrolines or ruthenium bipyridines; aza-BODIPY dyes, particularly preferably aza-BODIPY phenol red; triphenylmethane dyes, particularly preferably bromothymol blue, bromophenol blue or cresol red; fluorescein or fluorescein isothiocyanate (FITC), pyrene dyes, particularly preferably pyranine; or azo dyes.

In one embodiment, the pH-sensitive dye is selected from luminescent dyes, preferably aza-BODIPY dyes, particularly preferably aza-BODIPY phenol red; triphenylmethane dyes, particularly preferably bromothymol blue, bromophenol blue or cresol red; xanthene dyes, preferably rhodamine, fluorescein or fluorescein isothiocyanate (FITC); pyrene dyes, particularly preferably pyranine; or azo dyes.

Liu and Sullivan disclose temperature-sensitive dyes and pressure-sensitive dyes (Liu and Sullivan 2005). The temperature-sensitive and pressure-sensitive dyes are preferably selected from luminescent dyes. The temperature-sensitive dyes are particularly preferably selected from pyronines, more particularly preferably rhodamines; metalloperylenes, metallobipyridines, metallophenanthrolines, preferably tris (1,10-phenanthroline)ruthenium(II) dichloride; or europium (III) thenoyltrifluoroacetonate. The pressure-sensitive dyes are particularly preferably selected from metalloporphyrins, metalloperylenes, metallophenanthrolines, preferably tris(1, 10-phenanthroline)ruthenium(II) dichloride or metallobipyridines.

In one embodiment, the nitrogen oxide-sensitive dye is selected from metal oxides, preferably ZnO, $SnO_2$ or $V_2O_5$. In another embodiment, the dye is selected from nitro-sensitive dyes. A "nitro-sensitive dye" is understood to be a dye that is sensitive to nitro compounds, e.g. trinitrotoluene (TNT) or dinitrotoluene (DNT). In one embodiment, the nitro-sensitive dye is selected from metalloporphyrins.

In one embodiment, the amino-sensitive dye is selected from metal oxides, preferably ZnO, $SnO_2$ or $V_2O_5$.

In one embodiment, the peroxylate-sensitive dye is selected from luminescent dyes, preferably from metalloporphyrins.

An enzyme is a biomolecule that can accelerate a chemical reaction as a catalyst. Most enzymes are proteins. However, the term also encompasses catalytically active RNA (ribozymes). In one embodiment, the enzyme is selected from oxidoreductases or hydrolases; the enzyme is preferably selected from acetylcholinesterases or aldehyde dehydrogenases.

A protein is a biomolecule made up of amino acid residues through peptide bonds. The term encompasses both peptides having at least two amino acid residues and macromolecules, which can have several thousand amino acid residues and may also be composed of a plurality of polypeptide chains as subunits. In one embodiment, the protein is selected from globular and fibrillar proteins, such as globulins and keratin.

The term "antibody" within the meaning of the invention encompasses all antibodies or antibody fragments, which are able to bind specifically to an antigen. Recombinant antibodies are antibodies produced with the aid of genetically modified organisms. The term "antibody" encompasses both complete monoclonal antibodies and their epitope-binding fragments. Here, the epitope-binding fragments (also referred to here as antibody fragments) comprise those parts of the antibody which are able to bind to the antigen. Antibody fragments within the meaning of the invention include Fab, Fab', F(ab')$_2$, Fd, single-chain variable fragments (scFv), single-chain antibodies, disulfide-linked variable fragments (sdFv) and fragments that either contain a variable region of the light chain ($V_L$) or a variable region of the heavy chain ($V_H$). Antibody fragments contain variable regions either alone or in combination with other regions selected from the hinge region and the first, second and third region of the constant region ($C_H1$, $C_H2$, $C_H3$).

Furthermore, the term antibody encompasses recombinantly produced antibodies, such as diabodies, triabodies and tetrabodies. The term "antibody" also encompasses chimeric antibodies in which different parts of the antibody originate from different species, such as antibodies with a murine variable region combined with a human constant region. In one embodiment, the antibody is selected from immunoglobulins, preferably immunoglobulin A, immunoglobulin D, immunoglobulin E, immunoglobulin G, immunoglobulin M, immunoglobulin W or immunoglobulin Y. In one embodiment, the antibody is labelled, preferably labelled with a fluorescent dye, more particularly preferably labelled with fluorescein isothiocyanate, tetramethylrhodamine isocyanate or fluorescein.

The term nucleic acid within the meaning of this description encompasses deoxyribonucleic acids (DNA), ribonucleic acids (RNA) and peptide nucleic acids (PNA), as well as all modifications derived from these basic structures such as phosphorothioates, phosphoramidates, 0-methyl derivatives and locked nucleic acids (LNA). The nucleic acids can be single strands, double strands or structures mixed therefrom. In one embodiment, the nucleic acid is made up of different nucleotides.

Viruses are understood to be, in particular, infectious particles, which spread as virions outside of cells by transmission and multiply as viruses within a suitable host cell. In the present description, however, the term also encompasses weakened (attenuated) or recombinant viruses, which are not infectious or only able to multiply under certain circumstances (e.g. in special packaging cells). In one embodiment, the virus is selected from viruses for, for example water, water analysis.

A noble metal cluster is understood to be compounds of at least three noble metal atoms connected by metal-metal bonds. In one embodiment, the noble metal cluster is selected from silver clusters or gold clusters.

In a preferred embodiment, the at least one functional component is a luminescent dye and a noble metal cluster.

Advantageously, the noble metal cluster enhances the luminescence of the luminescent dye.

In embodiments of the method according to the invention, at least one functional component is added after step a) or after step a) and after step e), or only after step e).

In the case of temperature-sensitive functional components, such as viruses, nucleic acids and proteins, enzymes and antibodies, as well as temperature-sensitive dyes, the addition is preferably carried out after step e).

In a further embodiment of the method according to the invention, a functional group is added after step a), and subsequently another functional component selected from a dye, an enzyme, a protein, an antibody, a nucleic acid, a virus or a noble metal cluster is added.

In another embodiment of the method according to the invention, a functional group selected from hydrophobic functional groups, preferably organofunctional trialkoxysilanes, is added after step a), and subsequently another hydrophobic functional component is added. Advantageously, the functional component is not only kept adsorptively but also covalently in the system by the covalent bond.

In another embodiment of the method according to the invention, a functional group is added after step a), and subsequently another functional component is added, wherein the functional group is covalently bonded to the other functional component. The functional group and the other functional component are incorporated into the PMO according to the invention.

A multiply silylated organosilane is understood to be an organo-bridged alkoxysilane, an organo-bridged alkylhydroxysilane or an organo-bridged alkylchlorosilane. In one embodiment, the at least one multisilylated organosilane is selected from bisilanes, trisilanes, tetrasilanes and polysilanes, wherein bisilanes are understood to be organo-bridged silanes with two silyl groups, trisilanes are understood to be organo-bridged silanes with three silyl groups, tetrasilanes are understood to be organo-bridged silanes with four silyl groups and polysilanes are understood to be organo-bridged silanes with many silyl groups, wherein "with many silyl groups" is understood to be at least 5.

In one embodiment, the at least one multisilylated organosilane is selected from unsubstituted or substituted bissilanes, preferably from unsubstituted or substituted, saturated or unsaturated, linear or cyclic bis(trimethoxysilyl) or bis(triethoxysilyl) C1 to C12 hydrocarbon compounds, particularly preferably bis(trimethoxysilylmethyl)benzene, bis(trimethoxysilylethyl)benzene, bis(triethoxysilylethyl) benzene, bis(triethoxysilylethyl)biphenyl, 1,2-bis (trimethoxysilyl)ethane or bis[3-(trimethoxysilyl)propyl] amine.

C1 to C12 hydrocarbon compounds are understood to be hydrocarbon compounds having one to 12 carbon atoms.

In another embodiment, the at least one multisilylated organosilane is selected from unsubstituted or substituted trisilanes or tetrasilanes, preferably from unsubstituted or substituted, saturated or unsaturated, linear or cyclic tris (trimethoxysilyl), tris(triethoxysilyl), tetra(trimethoxysilyl) or tetra(triethoxysilyl) C1 to C12 hydrocarbon compounds, most particularly preferably from 1,3,5-tris(triethoxysilyl) benzene, 1,3,5-tris(triethoxysilyl)cyclohexane or tetra(triethoxysilylethyl)-silane.

A solvent is understood to be an inorganic or organic liquid, which is able to physically bring solids or liquids into solution. A prerequisite for suitability as a solvent is that neither the solvent nor the dissolved substance changes chemically during the dissolving process. In another embodiment of the method according to the invention, the solvent is selected from organic solvents, preferably acetone, ethanol, methanol and/or toluene.

In another embodiment of the method according to the invention, in step c) the at least one multiply silylated organosilane is dried and cross-linked on the surface of the monomodal mesoporous or macroporous glass at a temperature of between 60 and 170° C. for 12 to 24 hours, preferably at a temperature of at least the boiling point of the solvent and at most the boiling point of the multiply silylated organosilane. The functional component and the at least one multiply silylated organosilane are adsorbed and/or covalently bonded to the surface of the monomodal mesoporous or macroporous glass.

The surface is understood to be the inner and outer pore surface.

In a preferred embodiment of the method according to the invention, in step c) the at least one multiply silylated organosilane is dried and cross-linked on the surface of the monomodal mesoporous or macroporous glass for 18 hours.

In a further embodiment of the method according to the invention, the structure-directing agent in step d) is selected from ionic surfactants or non-ionic surfactants, preferably from ionic surfactants, more particularly preferably hydroxides of quaternary alkylammonium compounds.

In another embodiment of the method according to the invention, the ionic surfactant is produced from bromide and chloride salts of C6 to C18 alkyltrimethylammonium compounds or bromide and chloride salts of the alkylpyridinium compounds by anion exchangers, preferably from hexadecyltrimethylammonium bromide (CTAB), hexadecyltrimethylammonium chloride (CTAC), octadecyltrimethylammonium bromide (OTAB) or octadecyltrimethylammonium chloride (OTAC).

In another embodiment of the method according to the invention, the non-ionic surfactant is selected from triblock copolymers, preferably poloxamers or poly(ethylene oxide)-poly(DL-lactic acid-co-glycolic acid)-poly(ethylene oxide) ($EO_{16}(L_{28}G_3)EO_{16}$).

Poloxamers are understood to be block copolymers of ethylene oxide (EO) and propylene oxide (PO) or ethylene oxide (EO) and butylene oxide (BO).

In preferred embodiments of the method according to the invention, the non-ionic surfactant is selected from P-123 ($EO_{20}PO_{70}EO_{20}$), F-127 ($EO_{106}PO_{70}EO_{106}$) and B50-6600 ($EO_{39}BO_{47}EO_{39}$).

By selecting the structure-directing agent in step d), the pore diameter of the secondary pore system of the PMOs can advantageously be adjusted in the range of 2 nm to 50 nm.

In one embodiment of the method according to the invention, the pseudomorphic transformation in step d) is carried out at a pH of at least 12.

In one embodiment of the method according to the invention, the pseudomorphic transformation in step d) is carried out for 1 to 7 days, preferably for 3 days.

In another embodiment of the method according to the invention, the pseudomorphic transformation is carried out at a temperature of between 100° C. and 130° C.

In another embodiment of the method according to the invention, endcapping is carried out after steps a) to e). Endcapping is understood to be a replacement of terminal silanol groups, in particular by non-reactive groups, such as alkyl groups or alkylsilyl groups.

In one embodiment of the method according to the invention, endcapping replaces silanol groups with trimethylsilyl groups.

In one embodiment of the method according to the invention, endcapping closes the pores. In one embodiment of the method according to the invention, the pores are closed after steps a) to e), wherein after step a), at least one temperature-sensitive and/or pressure-sensitive dye is added.

In one embodiment, the secondary pores are closed by adding basic aminoorganoalkoxysilanes, preferably (3-aminopropyl)triethoxysilane (APTES). Due to the closed pores, there are advantageously no interactions between the at least one functional component, preferably a temperature-sensitive or pressure-sensitive dye, and the environment.

The method according to the invention advantageously produces periodic mesoporous materials having a bimodal pore system, wherein a narrow pore radius distribution is achieved. The PMOs are also advantageously produced while maintaining the macroscopic shape. The pore size of the secondary pores can also advantageously be varied by the selection of the structure-directing agent and the functionalisation can be varied by the selection of the functional component, wherein the method according to the invention results in a homogeneous distribution of the functional components in the PMO. Further advantageously is the flexible choice of the geometry of the starting material and the size of the transport pores.

Furthermore, the object is solved by functionalised bimodal periodic mesoporous organosilicates (PMOs) comprising at least one organosilicate and at least one functional component, wherein the functionalised bimodal PMOs have primary pores and secondary pores, wherein the primary pores are mesopores or macropores with an average pore diameter of 30 nm to 200 nm, preferably macropores with a diameter in the range of 60 to 200 nm, wherein the secondary pores are mesopores with an average pore diameter of 2 nm to 50 nm, preferably with a diameter in the range of 2 to 30 nm, more preferably in the range of 2 to 20 nm, wherein the functionalised bimodal PMOs have a specific surface area of at least 500 $m^2/g$.

According to the invention, the specific surface is understood to be the entirety of surfaces contained in a sample, also between grains and within pores. The specific surface area is preferably determined by nitrogen low-temperature adsorption (according to BET DIN-ISO 9277).

In another embodiment, the functionalised bimodal PMOs according to the invention have a specific surface area of between 500 $m^2/g$ and 1200 $m^2/g$. In a preferred embodiment, the functionalised bimodal PMOs according to the invention have a specific surface area between 800 $m^2/g$ and 1000 $m^2/g$.

In one embodiment, the functionalised bimodal PMOs according to the invention have a maximum of 10% closed pores, preferably a maximum of 5%, particularly preferably a maximum of 1%.

The proportion of open porosity can be determined by helium density measurements in accordance with DIN 1936.

In one embodiment of the functionalised bimodal PMOs according to the invention, the periodic mesoporous organosilicate has a hexagonal or cubic microscopic structure. The main components are $SiO_2$ with integrated organic bridges in the $SiO_2$ network. The PMOs preferably have a $SiO_2$ proportion of over 70%.

In another embodiment, the macroscopic shape of the functionalised bimodal PMOs is a membrane, a fibre, a cube, a sphere, a cylinder, a tube or granules.

Advantageously, the functionalised bimodal PMO according to the invention is dimensionally stable. Dimensionally stable is understood to mean the absence of shrinkage and the absence of crack formation. Furthermore advantageously, the bimodal PMOs according to the invention have pore systems with a narrow pore radius distribution and a homogeneous distribution of the functional components in the PMO.

Another aspect of the invention relates to an optical sensor comprising the functionalised bimodal PMO according to the invention.

In one embodiment, the optical sensor comprising the functionalised bimodal PMO according to the invention is designed for the qualitative and/or quantitative detection of an analyte in a sample, preferably the oxygen partial pressure, the proportion of dissolved oxygen or the carbon dioxide partial pressure of a sample, or for the quantification of the pH, pressure or temperature of a sample.

Another aspect of the invention relates to the use of the optical sensor for the qualitative and/or quantitative detection of an analyte in a sample, for the quantification of the oxygen partial pressure ($pO_2$), the dissolved oxygen (DO), the carbon dioxide partial pressure ($pCO_2$) and the pH, for the quantification of the pH, pressure and/or temperature of a sample.

Another aspect of the invention relates to the use of the functionalised bimodal PMOs according to the invention as a filter material, adsorption means, sensor material or carrier material for pharmaceutical products, insecticides or pesticides, preferably as a sensor material.

In one embodiment, the functionalised bimodal PMOs according to the invention are used as a coating for filter materials, adsorption means, sensor materials or carrier material for pharmaceutical products, insecticides or pesticides, preferably as a coating for sensor materials.

In order to implement the invention, it is also expedient to combine the above-described embodiments and features of the claims.

The invention will be explained in detail in the following with reference to some embodiments and accompanying drawings. The embodiments are intended to describe the invention without limiting it.

IN THE DRAWINGS

Figure 7:
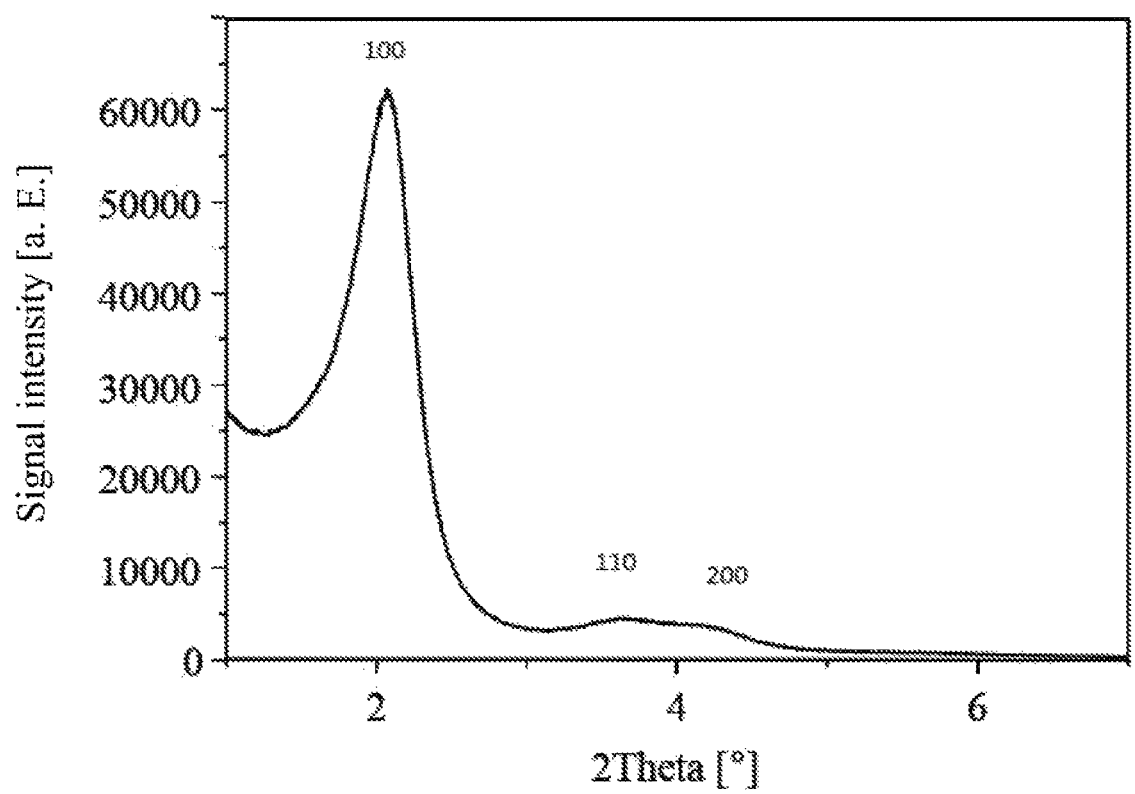

FIG. 7 shows the XRD diffractogram of PMO with PtTFPP 1 g of starting material is mixed with a mixture of functional component and 1:4 (m %) organosilane/toluene, shaken until homogeneous and left closed for a certain time at room temperature. Drying takes place overnight at 120° C. The sample is then mixed with the structure-directing agent and reacted for 1 to 7 d at the appropriate temperature. This is followed by extraction with methanolic hydrochloric acid. The sample is washed neutral with distilled water and dried at 120° C. overnight.

TABLE 1

Parameters used to produce functionalised bimodal PMOs with the addition of the functional component after step a).

| | |
|---|---|
| Starting material | e.g. porous glass as membranes, granules, spheres, cylinders, wafers with partially porous regions |
| Organosilane | e.g. bis(trimethoxysilylethyl)benzene |
| Functional component | e.g. platinum(II) 5,10,15,20-tetrakis-(2,3,4,5,6-pentafluorophenyl)porphyrin (PtTFPP) or 8-hydroxypyrene-1,3,6-trisulfonic acid (HPTS) |
| Functional component concentration | e.g. 0.5 percent by mass per 1 g of Starting material |
| Structure-directing agent | CTMAOH or coblock polymer P123 |
| Pseudomorphic transformation duration | 1 to 7 d |
| Reaction temperature | e.g. 120° C. |

1 g of starting material is shaken with a functional group in a suitable solvent (volume=triple the pore volume of the starting material) for 1 hour at room temperature. Drying takes place overnight at a certain temperature.

TABLE 2

Parameters used to bind a functional group after step a).

| | |
|---|---|
| Starting material | e.g. porous glass as membranes, granules, spheres, cylinders, wafers |
| Functional group (anchor molecule) | e.g. 3-mercaptopropyltrimethoxysilane, 3-aminopropyltriethoxysilane, N-(6-aminohexyl)aminopropyltrimethoxysilane |
| Functional group concentration | e.g. 7.5 percent by mass |
| Solvent | e.g. ethanol, acetone, toluene, water, mixtures of different solvents |
| Drying temperature | e.g. 90° C. |

A certain concentration of functional component is dissolved in 1 ml of solvent and catalyst. The mixture is added to 1 g of starting material, shaken until homogeneous and reacted for one hour at 75° C. Drying takes place overnight at a suitable temperature. This is followed by washing three times with a suitable solvent and washing once with another solvent at room temperature. Drying takes place overnight at the appropriate temperature. Subsequent PMO production: 1 g of sample is mixed with a mixture of 1:4 organosilane/ toluene, shaken until homogeneous and left closed for a certain time at room temperature. Drying takes place overnight at 120° C. The sample is then mixed with the structure-directing agent and reacted for 1 to 7 d at the appropriate temperature. This is followed by extraction with methanolic hydrochloric acid. The sample is washed neutral with distilled water and dried at 120° C. overnight.

| Parameters used to bind a functional component. | |
| --- | --- |
| Starting material | e.g. modified porous glass as membranes, granules, spheres, cylinders, wafers with partially porous modified regions |
| Functional component | e.g. platinum(II) 5,10,15,20-tetrakis-(2,3,4,5,6-pentafluorophenyl)porphyrin (PtTFPP) or 8-hydroxypyrene-1,3,6-trisulfonic acid (HPTS) |
| Functional component concentration | e.g. 0.75 percent by mass per 1 g Starting material |
| Solvent | e.g. dimethylformamide, toluene, ethanol |
| Catalyst | Triethylamine 20 μl with 1 g of starting material or hydrochloric acid |
| Drying temperature | e.g. 120° C. |
| Organosilane | e.g. bis(trimethoxysilylethyl)benzene |
| Structure-directing agent | CTMAOH or coblock polymer P123 |
| Pseudomorphic transformation duration | 1 to 7 d |
| Reaction temperature | e.g. 120° C. |

The sample was measured with a Quantachrome Autosorb iQ device at −196° C. Activation took place at 150° C. The PMO PtTFPP sample is a PMO produced from CPG spheres with starting pores of 120 nm in size. Bis(trimethoxysilylethyl)benzol was used as the organosilane and PtTFPP as the functional component.

TABLE 5

Results for nitrogen low-temperature adsorption of the PMOs functionalised with PtTFPP.

| Sample | Loading | Pore volume [cm$^3$/g] | Mesopore volume [cm$^3$/g] | BET-OF [m$^2$/g] |
| --- | --- | --- | --- | --- |
| PMOs functionalised with PtTFPP | 20% by mass | 0.9 | 0.7 | 852 |

Figure 1:
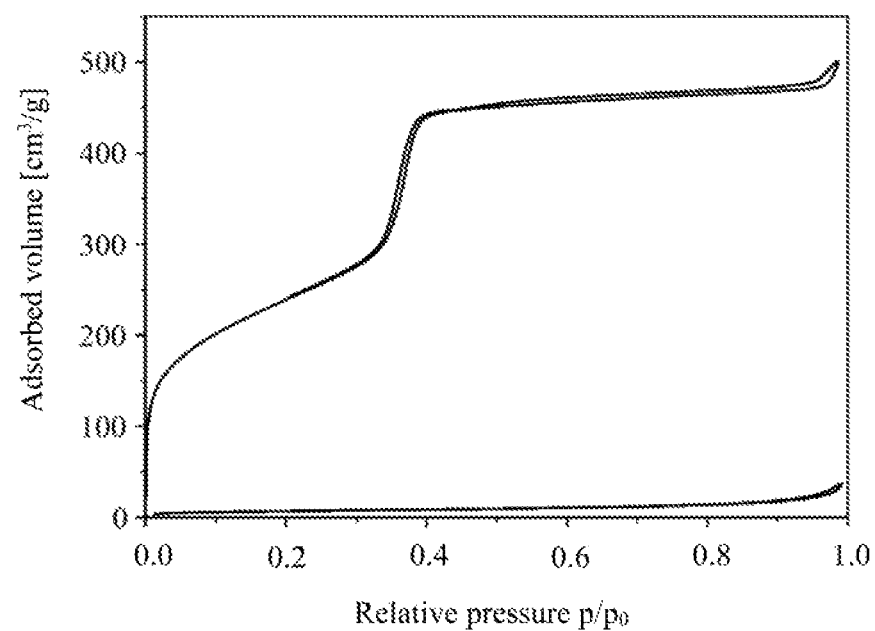
FIG. 1 shows (A) the nitrogen isotherm and (B) the pore radius distribution of PMOs functionalised with platinum(II) 5,10,15,20-tetrakis-(2,3,4,5,6-pentafluorophenyl)porphyrin (PtTFPP).
Figure 1:
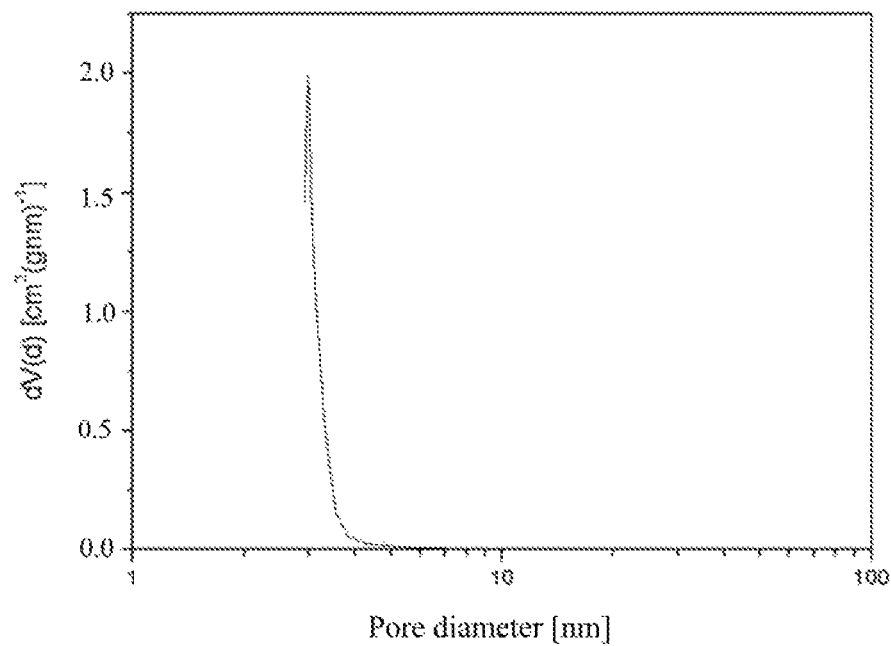

FIG. 1 shows (A) the nitrogen isotherm and (B) the pore radius distribution of PMOs functionalised with platinum(II) 5,10,15,20-tetrakis-(2,3,4,5,6-pentafluorophenyl)porphyrin (PtTFPP). The nitrogen isotherm corresponds to a sorption isotherm type IVb. There was a stepwise adsorption, typical for mesoporous materials, the increase at p≈0.95 indicates that starting pores are still present. The pore radius distribution confirms that pores with a diameter of 4 nm and starting pores (120 nm) are present.

Type IVb isotherm according to IUPAC, without hysteresis, is typical for mesoporous materials and shows pore diameters from 3 according to BJH and 4.1 according to DFT.

Thermogravimetry is the determination of the loss of mass of a substance in a temperature interval of RT −800° C. For this purpose, the sample is continuously heated at 10 K/min in a constant air flow (50 ml/min). If reactions such as dehydration, oxidation or decomposition occur with temperature increase, the mass of the sample is reduced. This change in mass is measured as a function of temperature or time. The loss of mass can be continuous or stepwise.

The measurements were carried out on the LINSEIS STA PT1600 from Linseis. The PMO PtTFPP sample used is a PMO produced from CPG spheres with starting pores of the size 120 nm. Bis(trimethoxysilylethyl)benzene was used as the organosilane and PtTFPP as the functional component.

Figure 2:
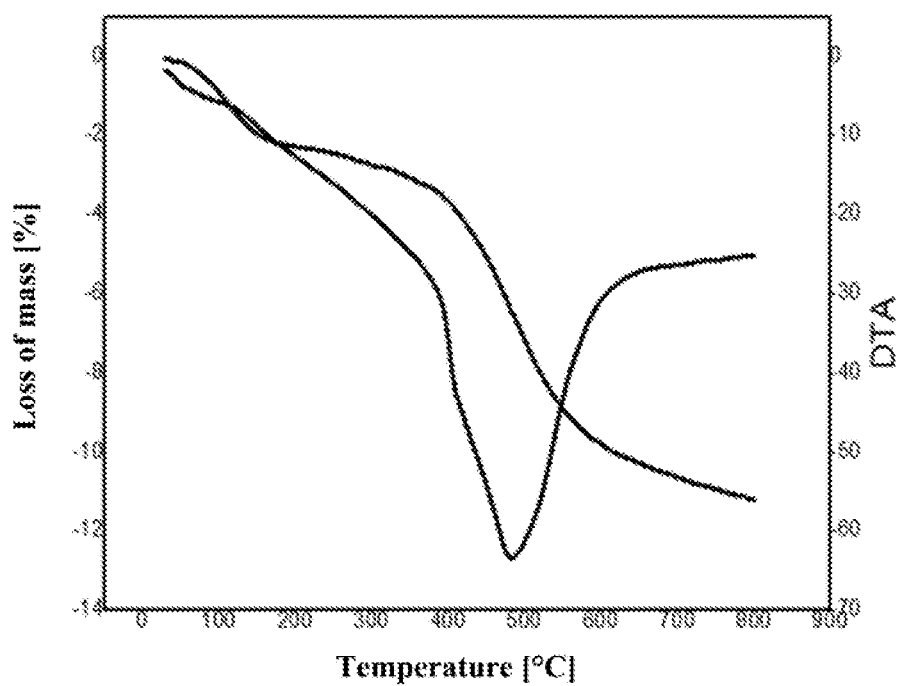
FIG. 2 shows the thermogravimetry/differential thermal analysis of PMOs functionalised with platinum(II) 5,10,15, 20-tetrakis-(2,3,4,5,6-pentafluorophenyl)porphyrin (PtTFPP).

FIG. 2 shows the thermogravimetry/differential thermal analysis of PMOs functionalised with platinum(II) 5,10,15,20-tetrakis-(2,3,4,5,6-pentafluorophenyl)porphyrin (PtTFPP). Thermogravimetry shows a loss of mass at 100° C. due to physisorbed water, a loss of mass at 420° C. due to the decomposition of organometallic complexes, a loss of mass at 500 to 650° C. due to phenyl groups incorporated in the silica network and a total loss of mass (200 to 800° C.) of 9% (m/m).

The $^{29}$Si CP-MAS NMR measurement was carried out using Bruker Avance 750, rotation frequency 7 kHz, repeat time 3 s and with a contact time of 5 ms.

The PMO PtTFPP sample used is a PMO produced from CPG spheres with starting pores of the size 120 nm. Bis(trimethoxysilylethyl)benzene was used as the organosilane and PtTFPP as the functional component. The PMO reference sample is a PMO produced from CPG spheres with starting pores of the size 120 nm. Bis(trimethoxysilylethyl)benzene was used as the organosilane.

Figure 3:
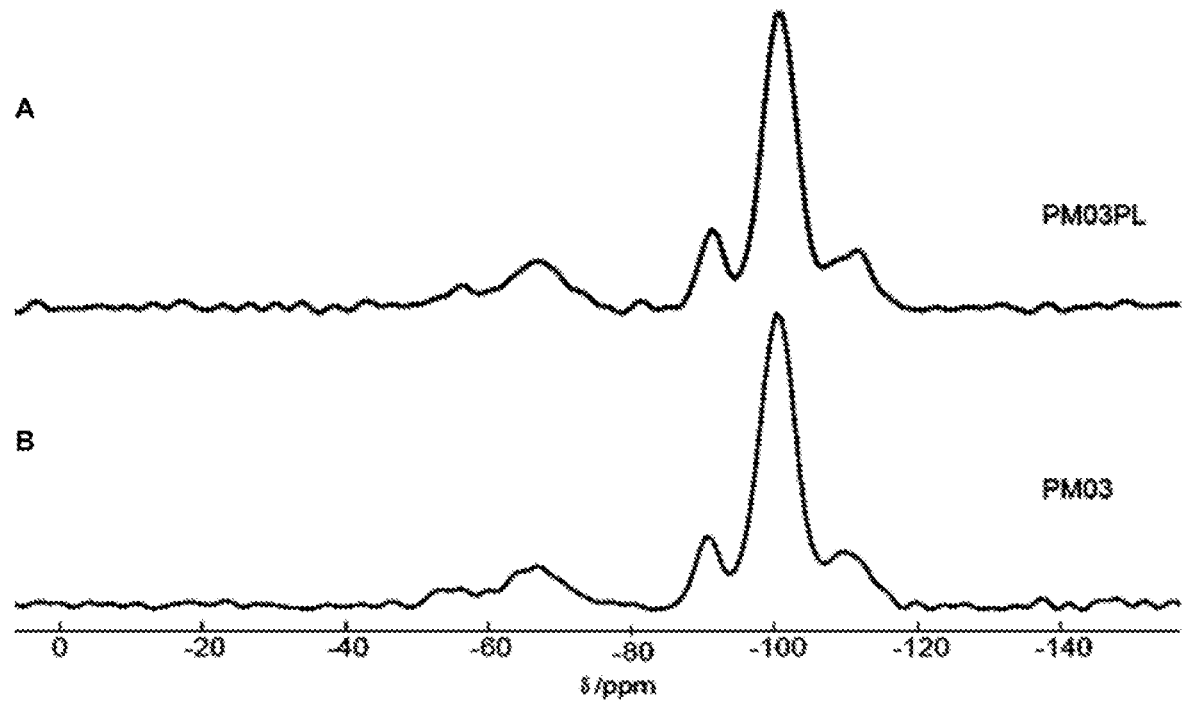
FIG. 3 shows the $^{29}Si$ cross-polarisation magic-angle spinning (CP-MAS) nuclear magnetic resonance (NMR) spectra of (A) PMOs without a functional component and (B) PMOs functionalised with PtTFPP.

FIG. 3 shows the $^{29}$Si cross-polarisation magic-angle spinning (CP-MAS) nuclear magnetic resonance (NMR) spectra of (A) PMOs without a functional component and (B) PMOs functionalised with PtTFPP. From the signals and their intensities (Table 6), it can be clearly seen that the direct input of the PtTFPP dye does not lead to any change in the silicate network. The dye does not affect the formation of the periodic mesoporous system and there is no bonding between the PMO and the dye. It can be assumed that the dye is encapsulated and adsorbed in the PMO network.

TABLE 6

Shifts and intensities of the $^{29}$Si CP-MAS NMR signals.

| Sample | T$^2$ | T$^3$ | Q$^2$ | Q$^3$ | Q$^4$ |
| --- | --- | --- | --- | --- | --- |
| PMOs functionalised with PtTFPP | −56.16 ppm 3.63% | −66.81 ppm 13.38% | −91.35 ppm 10.94% | −100.72 ppm 58.81% | −110.61 ppm 13.23% |

The $^{13}$C CP-MAS NMR measurement was carried out using Bruker Avance 750, rotation frequency 10 kHz, repeat time 3 s.

In order to demonstrate the bonding of the functional component PtTFPP, a model compound is used, which is very similar to the binding molecule in the porphyrin complex of PtTFPP, hexafluorobenzene. The PG APTES sample used are CPG spheres with starting pores of the size 120 nm modified with 3-aminopropyltriethoxyilane. The PG APTES hexafluorobenzene sample are CPG spheres with starting pores of the size 120 nm modified with 3-aminopropyltriethoxyilane and subsequent bonding of hexafluorobenzene to APTES.

Figure 4:
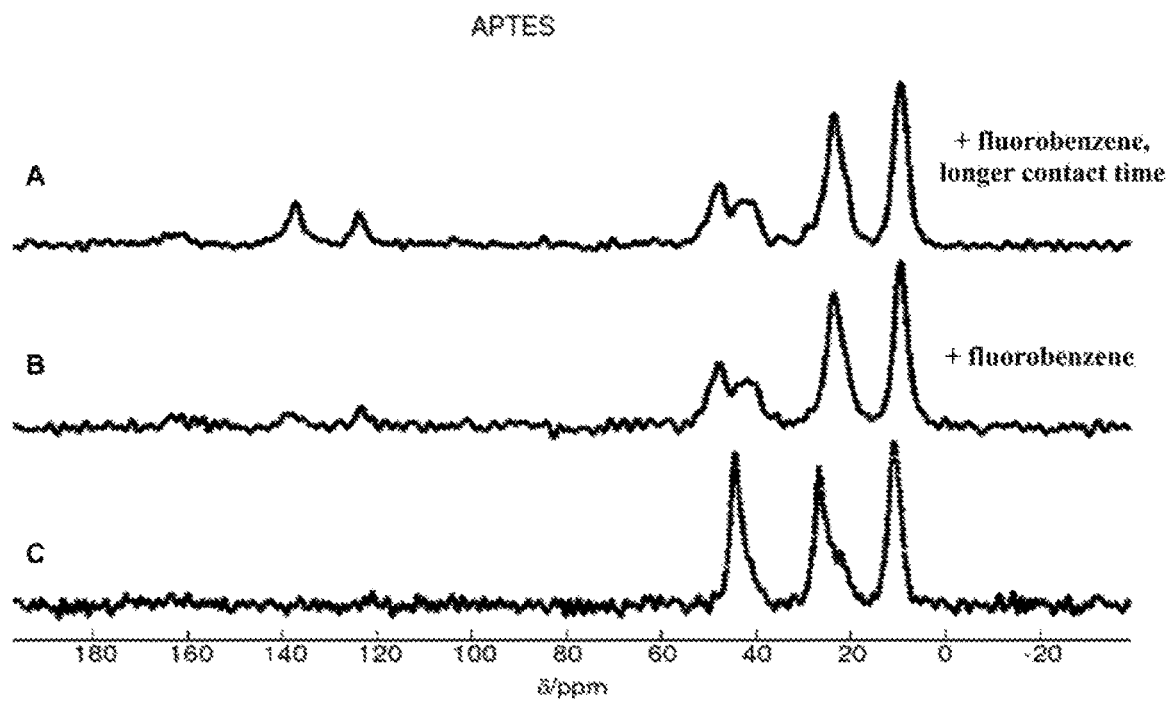
FIG. 4 shows the $^{13}C$ cross-polarisation magic-angle spinning (CP-MAS) nuclear magnetic resonance (NMR) spectra of (A) PMOs functionalised with (3-aminopropyl) triethoxysilane (APTES) and hexafluorobenzene with a contact time of 2 ms, (B) PMOs functionalised with APTES and hexafluorobenzene with a contact time of 500 μs, and (C) PMOs functionalised with APTES.

FIG. 4 shows the $^{13}$C cross-polarisation magic-angle spinning (CP-MAS) nuclear magnetic resonance (NMR) spectra of (A) CPG modified with (3-aminopropyl)triethoxysilane (APTES) and hexafluorobenzene with a contact time of 2 ms, (B) CPG modified with APTES and hexafluorobenzene with a contact time of 500 μs, and (C) CPG modified with APTES with a contact time of 500 μs.

The CP-MAS NMR measurement was carried out using Bruker Avance 750, rotation frequency 10 kHz, repeat time 3 s.

The $^{13}$C CP-MAS NMR spectra show that a covalent bond exists between APTES and hexafluorobenzene (Table 7 and Table 8). The signal of C3 at 45.3 ppm decreases and the signal of C—NH-benzene (C'3) at 48.3 ppm is clearly identifiable, as well as the benzene signals (aromatic range) 124 and 138 ppm in the aromatic range of 120 to 145 ppm. The C—NH—C signal (aromatic range) at 116 ppm cannot be identified due to insufficient concentration or contact time. The peak at 124 ppm shows that there is a change in hexafluorobenzene. It is no longer highly symmetrical.

Adsorption or no bonding would be expressed in a signal with a shift of 138 ppm (resolution in solid-state NMR too low to split the peak into two signals). It can therefore be assumed that the formation of a second aromatic signal describes a bond between APTES and hexafluorobenzene.

Hexafluorobenzene is highly symmetrical and gives two signals in the liquid $^{13}$C NMR (without fluorine decoupling) with the shifts of δ=137 and 139 ppm.

(3-Aminopropyl)triethoxysilane (APTES) (reference):

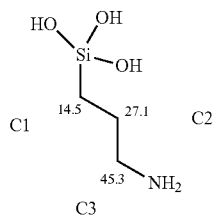

TABLE 7

Shifts and intensities of the APTES $^{13}$C CP-MA NMR signals.

|    | Shift δ [ppm] theory | Shift δ [ppm] | Intensity [%] |
|----|---------------------|---------------|---------------|
| C1 | 14.5                | 10.7          | 32.4          |
| C2 | 27.1                | 25.2          | 35.6          |
| C3 | 45.3                | 43.7          | 32            |

(3-Aminopropyl)triethoxysilane (APTES) and hexafluorobenzene (reference):

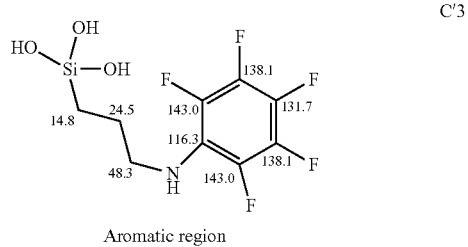 [SMILES: O[Si](O)(O)CCCNc1c(F)c(F)c(F)c(F)c1F]

Aromatic region

TABLE 8

Shifts and intensities of the APTES-hexafluorobenzene $^{13}$C CP-MAS NMR signals.

|    | Shift δ [ppm] theory | Shift δ [ppm] | Intensity [%] |
|----|---------------------|---------------|---------------|
| C1 | 14.8                | 9.5           | 28.6          |
| C2 | 24.5                | 23.6          | 30.3          |
| C3 | 45.3                | 43.0          | 14.7          |
| C'3 | 48.3               | 47.9          | 14.2          |
| Aromatic region | 116.3 | — | — |
| Aromatic region | 131-143 | 123.8 . . . 137.2 | 4.4 . . . 7.8 |

Figure 5:
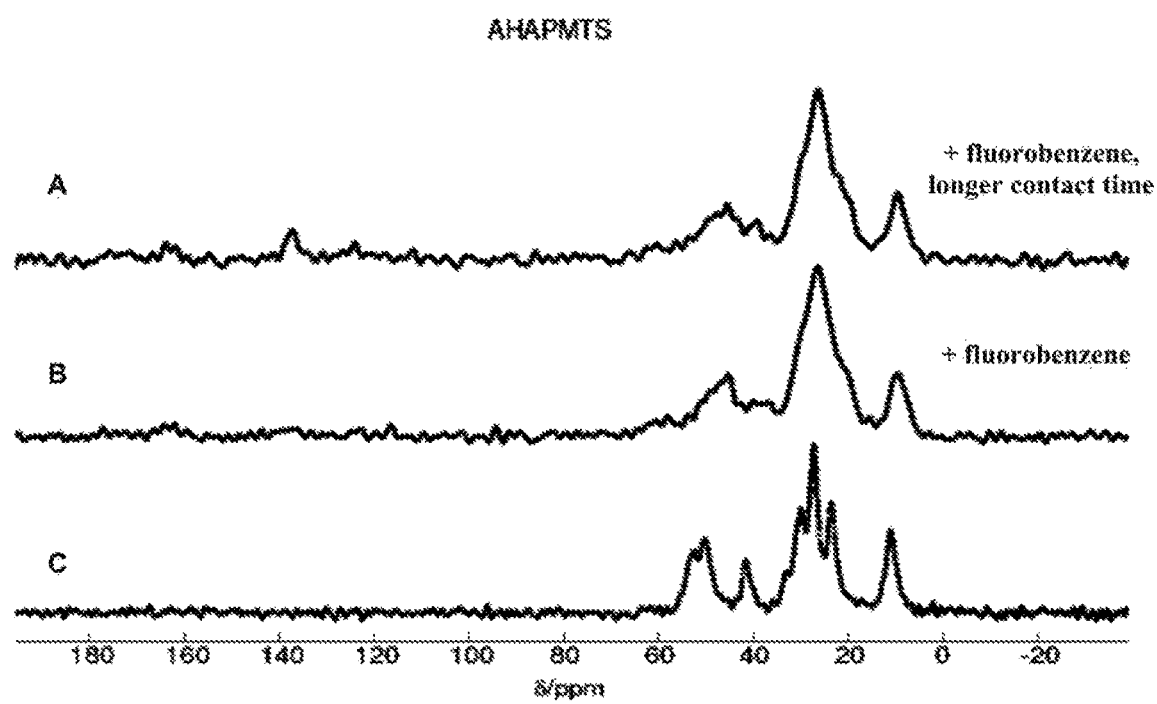
FIG. 5 shows the $^{13}C$ cross-polarisation magic-angle spinning (CP-MAS) nuclear magnetic resonance (NMR) spectra of (A) PMOs functionalised with N-(6-aminohexyl) aminopropyltrimethoxysilane (AHAPTMS) and hexafluorobenzene with a contact time of 2 ms, (B) PMOs functionalised with AHAPTMS and hexafluorobenzene with a contact time of 500 ps, and (C) PMOs functionalised with AHAPTMS.

FIG. 5 shows $^{13}$C cross-polarisation magic-angle spinning (CP-MAS) nuclear magnetic resonance (NMR) spectra of (A) CPG modified with N-(6-aminohexyl)aminopropyltrimethoxysilane (AHAPTMS) and hexafluorobenzene with a contact time of 2 ms, (B) CPG modified with AHAPTMS and hexafluorobenzene with a contact time of 500 μs, and (C) CPG modified with AHAPTMS with a contact time of 500 μs.

The signal of C—NH$_2$ at 41.6 ppm (theory 42.1 ppm) decreases due to the addition of hexafluorobenzene. The signal of C—NH benzene at 45.4 ppm (theory 45.1 ppm) is clearly identifiable and shows that a covalent bond exists between APTES and hexafluorobenzene. The CP-MAS NMR measurement was carried out with Bruker Avance 750, rotation frequency 10 kHz, repeat time 3 s.

N-(6-aminohexyl)aminopropyltrimethoxysilane (AHAPTMS) theory:

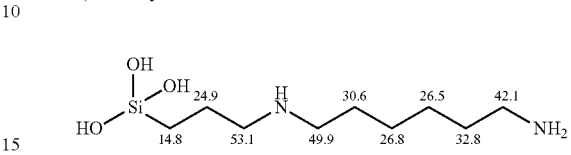

N-(6-aminohexyl)aminopropyltrimethoxysilane (AHAPTMS) and hexafluorobenzene (theory):

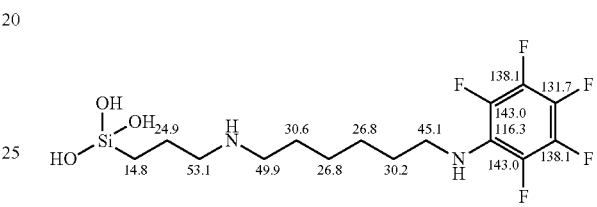

Detection of the incorporation of the functional component into the PMO

The functionalised bimodal PMOs were rinsed thoroughly with toluene. There was no leaching effect, which confirmed the incorporation of the functional component into the network.

Oxygen measurement and determination of the Stern-Volmer constant

Figure 6:
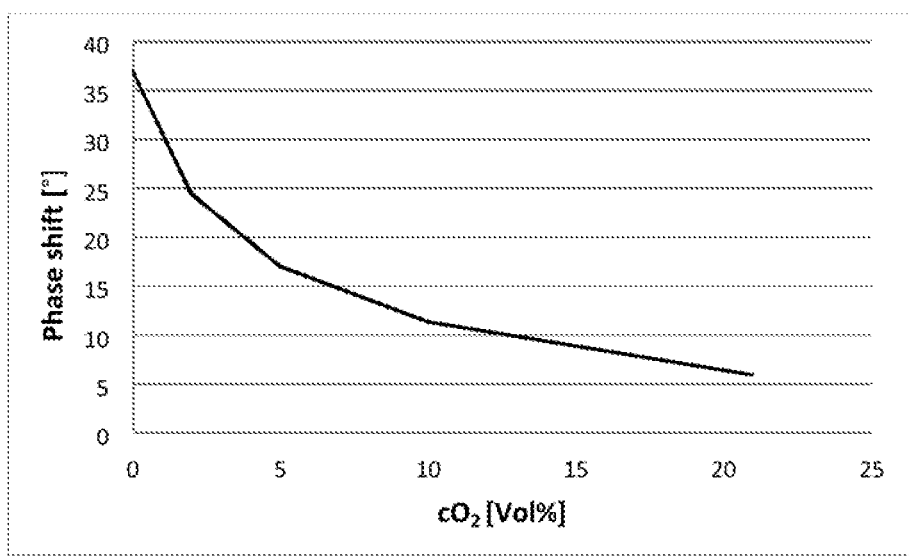
FIG. 6 shows (A) the phase shift and (B) the Stern-Volmer plot of PMOs functionalised with PtTFPP in the oxygen concentration range of 0 to 20.95 vol. %.
Figure 6:
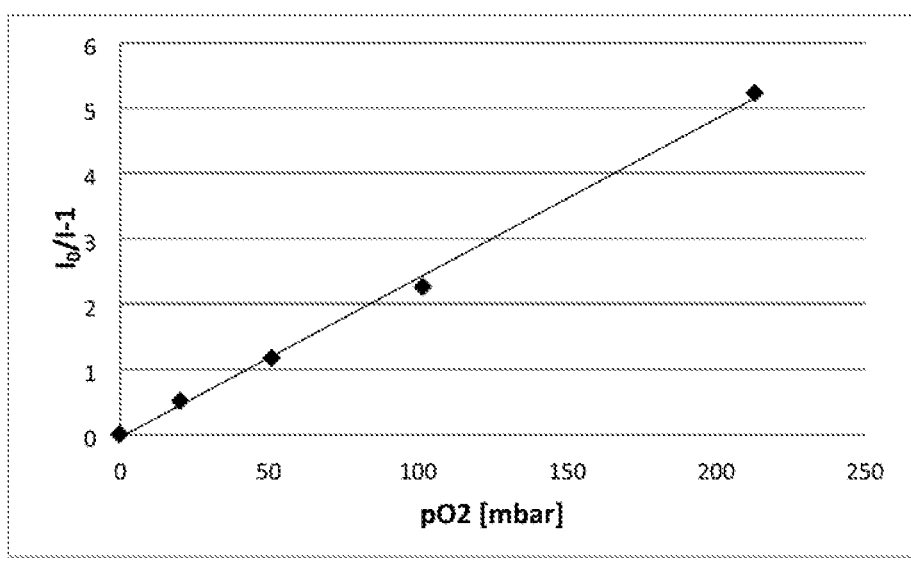

The oxygen measurement was carried out from 0 vol. % to 20.95 vol. % oxygen to nitrogen (FIG. 6).

FIG. 6 shows (A) the phase shift and (B) the Stern-Volmer plot of PMOs functionalised with PtTFPP in the oxygen concentration range of 0 to 20.95 vol. %. The Stern-Volmer equation describes the dependence of the intensity of the fluorescence of a fluorescent dye on the concentration of substances that quench the fluorescence, e.g. oxygen. The Stern-Volmer plot shows a linear course and the Stern-Volmer constant $K_{SV}$ was determined to be 0.0244.

FIG. 7 shows a diffractogram of the functionalised bimodal PMOs. This has the reflections 100, 110 and 200, which are typical for hexagonal pore structure with pseudo-crystalline walls.

CITED NON-PATENT LITERATURE

T. Yanagisawa, T. Shimizu, K. Kuroda, C. Kato, Bull. Chem. Soc. Jpn. 1990, 63, 988-992.

C. T. Kresge, M. E. Leonowicz, W. J. Roth, J. C. Vartuli, J. S. Beck, Nature 1992, 359, 710-712.

J. S. Beck, J. C. Vartuli, W. J. Roth, M. E. Leonowicz, C. T. Kresge, K. D. Schmitt, C. T-W. Chu, D. H. Olson, E. W. Sheppard, S. B. McCullen, J. e.g. Higgins, J. L. Schlenkert, J. Am. Chem. Soc. 1992, 114, 10834-10843.

T. Asefa, M. J. MacLachlan, N. Coombs, G. A. Ozin, Nature, 402, 1999

H. Uhlig, University of Leipzig, Faculty of Chemistry and Mineralogy, dissertation 2015, 1-167.

K. J. Shea, D. A. Loyt, O. Webster, J. Am. Chem. Soc. 1992, 114, 6700-6710.

D. A. Loyt, K. J. Shea, Chem. Rev. 1995, 95, 1431-1442.

K. J. Shea, D. A. Loy, Chem. Mater. 2001, 13, 3306-3319.

S. Inagaki, S. Guan, Y. Fukushima, T. Ohsuna, 0. Terasaki, J. Am. Chem. Soc. 1999, 121, 9611-9614.

e.g. J. Melde, B. T. Holland, C. F. Blanford, A. Stein, Chem. Mater. 1999, 11, 3302-3308.

F. Hoffmann, M. Cornelius, J. Morell, M. Fröba, Angew. Chem. 2006, 118, 3290-3328.

G. S. Attard, J. C. Glyde, C. G. Göltner, Nature 1995, 378, 366.

A. Monnier, F. Schüth, Q. Huo, D. Kumar, D. Margolese, R. S. Maxwell, G. Stucky, M. Krishnamurty, P. Petroff, A. Firouzi, M. Janicke, B. Chmelka, Science 1993, 261, 1299.

T. Liu, J. P. Sullivan, Pressure and Temperature Sensitive Paints, Springer-Verlag Berlin Heidelberg 2005.

E. W. Washburn, The Dynamics of Capillary Flow. Physical Review Vol. 1921, 17, 3, 273-283.

The invention claimed is:

1. A method for producing functionalised bimodal periodic mesoporous organosilicates (PMOs) by means of pseudomorphic transformation, comprising the following steps:
    a) providing a monomodal mesoporous or macroporous glass,
    b) adding at least one multiply silylated organosilane and a solvent,
    c) drying and cross-linking the at least one multiply silylated organosilane on the surface of the monomodal mesoporous or macroporous glass,
    d) adding at least one structure-directing agent and pseudomorphic transformation,
    wherein by the partial pseudomorphic transformation a bimodal pore system, comprising primary and secondary pores, is formed,
    e) extracting the structure-directing agent,
    wherein at least one functional component is added after step a) and/or after step e), wherein the macroscopic shape of the mesoporous or macroporous glass remains unchanged during steps b) to e),
    thereby forming the functionalised bimodal periodic mesoporous organosilicates (PMOs), which have mesopores with an average pore diameter of 2 nm to 50 nm.

2. The method according to claim 1, wherein the at least one functional component is selected from a functional group, a dye, an enzyme, a protein, an antibody, a nucleic acid, a virus or a noble metal cluster.

3. The method according to claim 1, wherein the at least one functional group added after step a) and/or after step e) is covalently bonded with at least one other functional component.

4. The method according to claim 1, wherein the structure-directing agent is selected from ionic surfactants or non-ionic surfactants.

5. The method according to claim 1, wherein endcapping is carried out after steps a) to e).

6. The method according to claim 1, wherein the Ffunctionalised bimodal periodic mesoporous organosilicates (PMOs) compriseing at least one organosilicate and at least one functional component,
    wherein the functionalised bimodal PMOs have primary pores and secondary pores,
    wherein the secondary pores branch off from the primary pores,
    wherein the primary pores are pores with a larger pore diameter, also called transport pores, and the secondary pores are pores with a smaller pore diameter, also called reaction pores,
    wherein the primary pores are mesopores or macropores with an average pore diameter of 30 nm to 200 nm,
    wherein the secondary pores are hexagonal or cubic mesopores with an average pore diameter of 2 nm to 50 nm, and
    wherein the functionalised bimodal PMOs have a specific surface area of at least 500 $m^2/g$.

7. The method according to claim 6, wherein the functional component is selected from a functional group, a dye, an enzyme, a protein, an antibody, a nucleic acid, a virus or a noble metal cluster.

8. The functionalised bimodal PMOs method according to claim 6, wherein the macroscopic shape of the PMOs is a membrane, a fibre, a cube, a sphere, a cylinder, a tube or granules.

9. The method according to claim 1, wherein the functionalised bimodal periodic mesoporous organosilicates (PMOs) have primary pores and secondary pores, and wherein the secondary pores branch off from the primary pores.

10. The method according to claim 9 wherein the primary pores are pores with a larger pore diameter, also called transport pores, and the secondary pores are pores with a smaller pore diameter, also called reaction pores.

11. The method according to claim 10, wherein the primary pores are mesopores or macropores with an average pore diameter of 30 nm to 200 nm.

12. The method according to claim 11, wherein the secondary pores are hexagonal or cubic mesopores with an average pore diameter of 2 nm to 50 nm.

13. The method according to claim 2 wherein at least one functional group is added after step a) or after step e), and the functional group is covalently bonded with at least one other functional component.

14. The method according to claim 13, wherein the structure-directing agent is selected from ionic surfactants or non-ionic surfactants.

15. The method according to claim 2, wherein the structure-directing agent is selected from ionic surfactants or non-ionic surfactants.

16. The method according to claim 2, wherein endcapping is carried out after steps a) to e).

17. The method according to claim 13, wherein endcapping is carried out after steps a) to e).

18. The method according to claim 15, wherein endcapping is carried out after steps a) to e).

19. The method according to claim 1, wherein the PMOs have a macroscopic shape that is a membrane, a fibre, a cube, a sphere, a cylinder, a tube or granules.

20. The method according to claim 1, wherein the at least one multiply silylated organosilane is selected from unsubstituted or substituted organo-bridged silanes.

* * * * *

UNITED STATES PATENT AND TRADEMARK OFFICE
CERTIFICATE OF CORRECTION

PATENT NO. : 11,261,126 B2
APPLICATION NO. : 16/766948
DATED : March 1, 2022
INVENTOR(S) : Czihal et al.

It is certified that error appears in the above-identified patent and that said Letters Patent is hereby corrected as shown below:

In the Claims

Column 15, Lines 55-56: Claim 6, Delete "Ffunctionalised" and insert -- functionalised --

Column 15, Line 57: Claim 6, Delete "compriseing" and insert -- comprise --

Column 16, Line 18: Claim 8, Delete "The functionalized bioodal PMOs method" and insert -- The method --

Signed and Sealed this
Seventeenth Day of May, 2022

Katherine Kelly Vidal
*Director of the United States Patent and Trademark Office*